(12) United States Patent
Lee et al.

(10) Patent No.: US 10,319,522 B2
(45) Date of Patent: Jun. 11, 2019

(54) MULTILAYER CERAMIC CAPACITOR AND METHOD FOR MANUFACTURING THE SAME

(71) Applicant: SAMSUNG ELECTRO-MECHANICS CO., LTD., Suwon-si, Gyeonggi-do (KR)

(72) Inventors: Taek Jung Lee, Suwon-si (KR); Hyo Youn Lee, Suwon-si (KR); Seung Woo Song, Suwon-si (KR); Jong Pil Lee, Suwon-si (KR); Sung Kwon An, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/829,338

(22) Filed: Dec. 1, 2017

(65) Prior Publication Data

US 2018/0342351 A1 Nov. 29, 2018

(30) Foreign Application Priority Data

May 29, 2017 (KR) ........................ 10-2017-0066230

(51) Int. Cl.
*H01G 4/30* (2006.01)
*H01G 4/33* (2006.01)
*H01G 4/012* (2006.01)
*H01G 4/232* (2006.01)

(52) U.S. Cl.
CPC ........... *H01G 4/012* (2013.01); *H01G 4/2325* (2013.01); *H01G 4/308* (2013.01)

(58) Field of Classification Search
None
See application file for complete search history.

(56) References Cited

U.S. PATENT DOCUMENTS

| | | | | |
|---|---|---|---|---|
| 2008/0137263 | A1* | 6/2008 | Min | H01G 4/232 361/311 |
| 2010/0300602 | A1 | 12/2010 | Ichiyanagi et al. | |
| 2011/0075317 | A1* | 3/2011 | Oikawa | H01G 4/005 361/303 |
| 2015/0021080 | A1* | 1/2015 | Lee | H01G 4/005 174/260 |
| 2015/0124371 | A1* | 5/2015 | Park | H01G 4/012 361/301.4 |
| 2016/0163463 | A1* | 6/2016 | Namikawa | H01G 4/33 361/301.3 |

FOREIGN PATENT DOCUMENTS

| | | |
|---|---|---|
| JP | 5482062 B2 | 4/2014 |
| JP | 5535765 B2 | 7/2014 |
| JP | 5753748 B2 | 7/2015 |

* cited by examiner

*Primary Examiner* — Dion Ferguson
(74) *Attorney, Agent, or Firm* — Morgan Lewis & Bockius LLP (57) ABSTRACT

A multilayer ceramic capacitor includes: a capacitance layer including dielectric layers and first and second internal electrodes disposed with respective dielectric layers interposed therebetween; a protection layer disposed on one surface of the capacitance layer; an alpha connection electrode provided in an alpha via penetrating through the protection layer; and a beta connection electrode provided in a beta via penetrating through the capacitance layer and connected to the alpha via. The alpha via has a diameter greater than that of the beta via.

17 Claims, 6 Drawing Sheets

MULTILAYER CERAMIC CAPACITOR AND METHOD FOR MANUFACTURING THE SAME

CROSS-REFERENCE TO RELATED APPLICATION(S)

This application claims the benefit of priority to Korean Patent Application No. 10-2017-0066230 filed on May 29, 2017 in the Korean Intellectual Property Office, the disclosure of which is incorporated herein by reference in its entirety.

BACKGROUND

1. Field

The present disclosure relates to a multilayer ceramic capacitor and a method for manufacturing the same.

2. Description of Related Art

In accordance with the trend toward high frequency, high current, and low voltages in the central processing units (CPU) of electronic products such as a smartphones, personal computers (PC), and the like, the importance of preventing a voltage fluctuation phenomenon in a power supply terminal has increased.

Particularly, high capacitance and low equivalent series inductance (ESL) have been required in a capacitor in an output terminal of a power supply.

Therefore, a multilayer ceramic capacitor in which internal electrodes are connected to each other by forming a via or through hole in the multilayer ceramic capacitor and filling the via or through hole with a conductive material has been developed.

SUMMARY

An aspect of the present disclosure may provide a multilayer ceramic capacitor having low equivalent series inductance while having high capacitance.

According to an aspect of the present disclosure, a multilayer ceramic capacitor having a novel structure includes: a capacitance layer including dielectric layers and first and second internal electrodes disposed with respective dielectric layers interposed therebetween; a protection layer disposed on one surface of the capacitance layer; an alpha connection electrode provided in a plurality of alpha vias penetrating through the protection layer; and a beta connection electrode provided in a plurality of beta vias penetrating through the capacitance layer and connected to the alpha vias. The alpha via has a diameter greater than that of the beta via.

According to another aspect of the present disclosure, a method for manufacturing a multilayer ceramic capacitor capable of efficiently manufacturing a multilayer ceramic capacitor having a novel structure includes: preparing a body including a capacitance layer including dielectric layers and first and second internal electrodes disposed with respective dielectric layers interposed therebetween, and a protection layer disposed on one surface of the capacitance layer; forming an alpha via penetrating through the protection layer; forming a beta via penetrating through the capacitance layer exposed in the alpha via and having a diameter smaller than that of the alpha via; and forming alpha and beta connection electrodes by filling the alpha and beta vias with a conductive material.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

In the accompanying drawings, an X direction may refer to a first direction or a length direction, a Y direction may refer to a second direction or a width direction, and a Z direction may refer to a third direction, a thickness direction, or a stacking direction.

Multilayer Ceramic Capacitor

Figure 1:
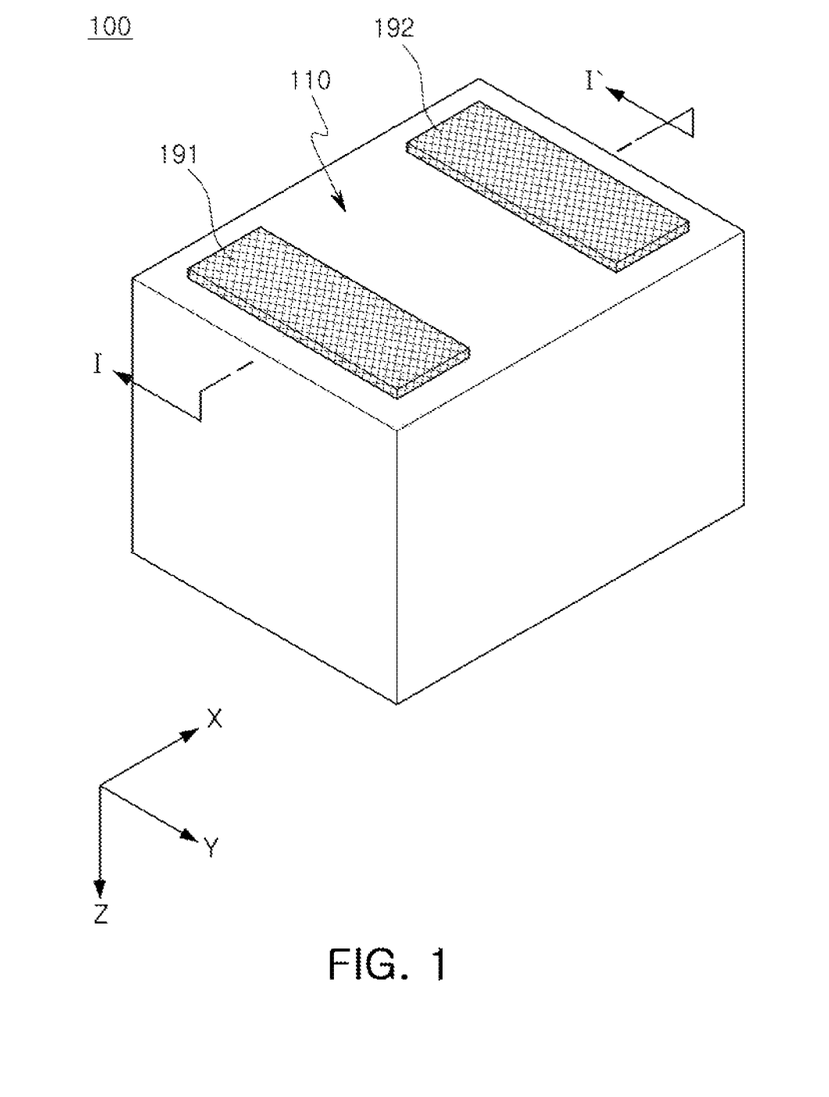
FIG. 1 is a schematic perspective view illustrating a multilayer ceramic capacitor according to an exemplary embodiment in the present disclosure.
Figure 2:
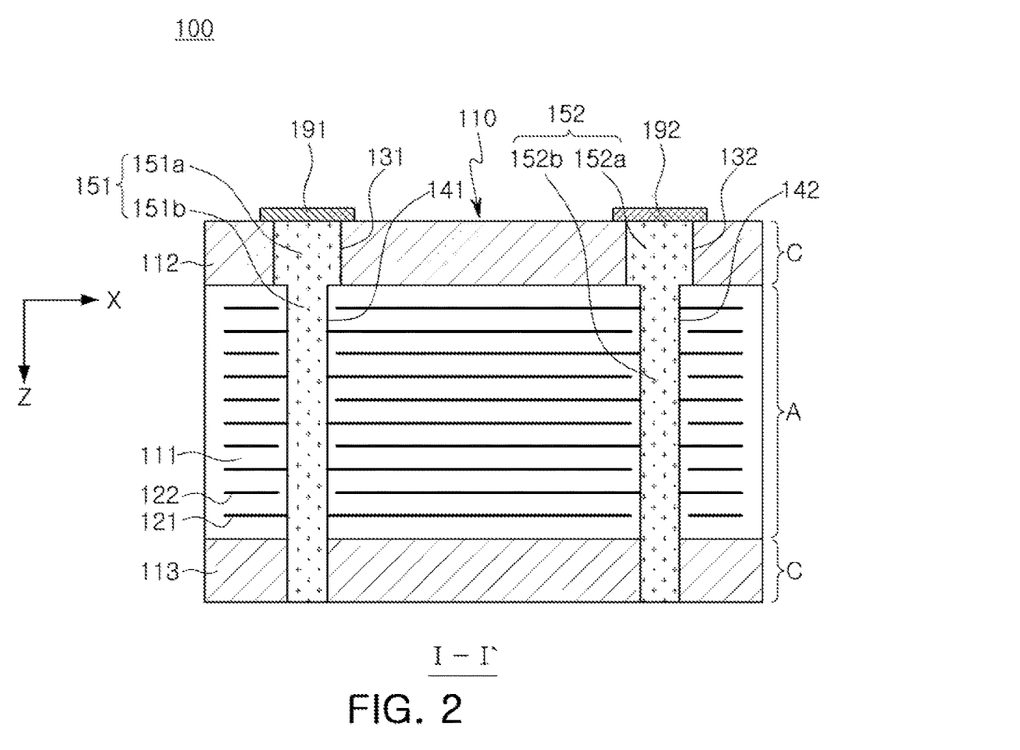
FIG. 2 is a schematic cross-sectional view taken along line I-I' of FIG. 1.

FIG. 1 is a schematic perspective view illustrating a multilayer ceramic capacitor according to an exemplary embodiment in the present disclosure, FIG. 2 is a schematic cross-sectional view taken along line I-I' of FIG. 1.

A multilayer ceramic capacitor 100 according to the exemplary embodiment in the present disclosure will be described with reference to FIGS. 1 and 2.

The multilayer ceramic capacitor 100 according to the exemplary embodiment in the present disclosure may include a body 110 and first and second external electrodes 191 and 192 disposed on an external surface of the body. The body 110 may include a capacitance layer A and a protection layer C.

The body 110 may include a plurality of stacked dielectric layers 111, and may be obtained by stacking a plurality of green sheets and sintering the stacked green sheets. The plurality of dielectric layers 111 may be integrated with each other by the sintering as described above. A shape and dimensions of the body 110 and the number of stacked dielectric layers 111 are not limited to those of the exemplary embodiment illustrated in FIGS. 1 and 2. For example, the body 110 may have a rectangular parallelepiped shape as illustrated in FIG. 1.

The dielectric layer 111 included in the body 110 may contain a ceramic material having high permittivity. For example, the dielectric layer 111 may contain a barium titanate ($BaTiO_3$) based material or a strontium titanate ($SrTiO_3$) based material, but another material known in the art may also be used as long as sufficient capacitance may be obtained. The dielectric layer 111 may further contain an additive, an organic solvent, a plasticizer, a binder, a dispersant, and the like, in addition to the above-mentioned ceramic material corresponding to a main ingredient. Among them, the same material as a material contained in internal electrodes 121 and 122 may be contained as the additive, and a content of the additive as described above may be locally suitably adjusted so as to secure uniform sintering properties.

The body 110 may be formed by stacking four or more dielectric layers 111. For example, the body 110 may be formed by stacking 400 to 500 dielectric layers. Upper and lower cover layers 112 and 113 formed by stacking dielectric layers on which an internal electrode is not formed may be disposed in upper and lower portions of the body 110. The upper and lower cover layers 112 and 113 may correspond to the protection layer C. That is, the protection layer C may be disposed on and below the capacitance layer A.

First and second internal electrodes 121 and 122 disposed to face each other with respective dielectric layers 111 interposed therebetween may be included in an inner portion, that is, the capacitance layer A of the body 110. The first and second internal electrodes 121 and 122 may be connected to different external electrodes 191 and 192 to thereby have different polarities from each other at the time of driving. The first and second internal electrodes 121 and 122 may be obtained by printing a paste containing a conductive metal on one surface of a ceramic green sheet to a predetermined thickness and then sintering the printed ceramic green sheet. An example of a main material configuring the first and second internal electrodes 121 and 122 may include nickel (Ni), copper (Cu), palladium (Pd), silver (Ag), or the like, and an alloy thereof may also be used.

The internal electrodes 121 and 122 may be connected to the external electrodes 191 and 192 through connection electrodes 151 and 152, respectively.

Here, the connection electrodes 151 and 152 may include alpha connection electrodes 151a and 152a formed in the protection layer C and beta connection electrodes 151b and 152b formed in the capacitance layer A, respectively.

The beta connection electrodes 151b and 152b may include a first beta connection electrode 151b connected to the first internal electrode 121 and a second beta connection electrode 152b connected to the second internal electrode 122. Further, the alpha connection electrodes 151a and 152a may include a first alpha connection electrode 151a formed in a position corresponding to the first beta connection electrode 151b and a second alpha connection electrode 152a formed in a position corresponding to the second beta connection electrode 152b. The first beta connection electrode 151b may be disposed to come into contact with the first internal electrode 121 and to be spaced apart from the second internal electrode 122, and the second beta connection electrode 152b may be disposed to come into contact with the second internal electrode 122 and to be spaced apart from the first internal electrode 121.

The first external electrode 191 may be disposed on one surface of the protection layer C and connected to the first alpha connection electrode 151a, and the second external electrode 192 may be disposed on one surface of the protection layer C and connected to the second alpha connection electrode 152a.

Alpha vias 131 and 132 penetrating through the protection layer C may be formed in the protection layer C. The first and second alpha connection electrodes 151a and 152a may be formed by filling the alpha vias 131 and 132 with a conductive material. Further, beta vias 141 and 142 connected to the alpha vias 131 and 132 and penetrating through the capacitance layer A may also be formed in the capacitance layer A. The first and second beta connection electrodes 151b and 152b may be formed by filling the beta vias 141 and 142 with a conductive material. The diameter of the alpha vias 131 and 132 may be substantially constant, and the diameter of the beta vias 141 and 142 may be substantially constant.

Figure 3:
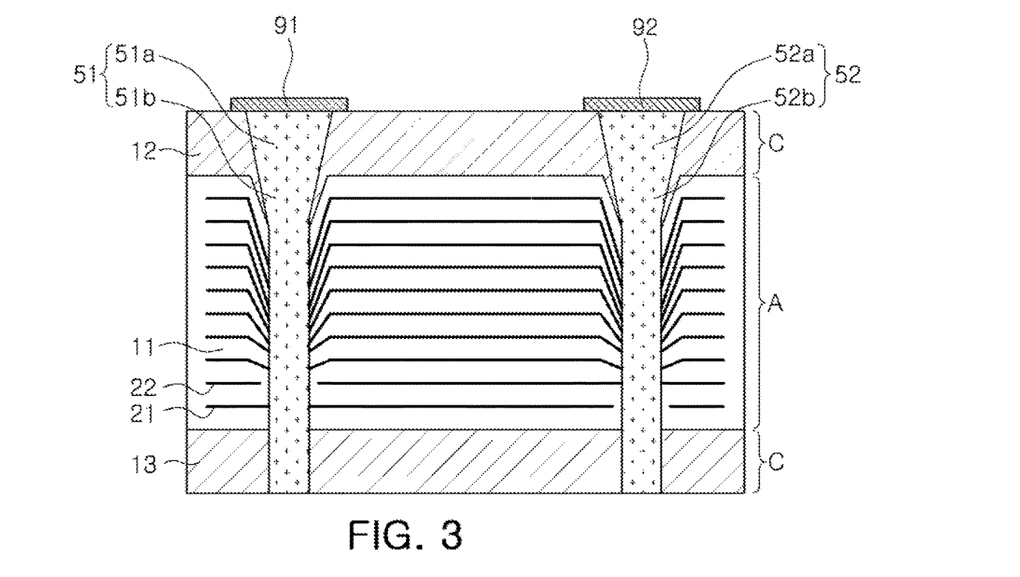
FIG. 3 is a schematic cross-sectional view illustrating a multilayer ceramic capacitor according to Comparative Example.

FIG. 3 is a schematic cross-sectional view illustrating a multilayer ceramic capacitor according to a Comparative Example.

A process for forming vias in a multilayer ceramic capacitor according to the related art will be described with reference to FIG. 3.

In the multilayer ceramic capacitor according to the related art in which internal electrodes 21 and 22 are connected to each other by filling vias with a conductive material, after forming a body by printing the internal electrodes 21 and 22 on ceramic sheets and stacking, compressing, and sintering the ceramic sheets on which the internal electrodes 21 and 22 are printed, vias 51 and 52 connected to the internal electrodes 21 and 22 may be formed in the body using a pin, a drill, a laser, or the like. External electrodes 91 and 92 may be electrically connected to the internal electrodes 21 and 22 by filling the vias 51 and 52 with a conductive material.

In a case of forming the vias using the laser at the time of forming the vias, the internal electrodes may be deformed by heat, such that a defect such as a short circuit occurring between the internal electrodes may be significantly increased. In a case of forming the vias using a physical penetration tool such as the pin or the drill without using the laser, an upper cover layer 12 may be deformed by a physical penetration tool in a direction in which the vias 51 and 52 are formed as illustrated in FIG. 3.

That is, the vias 51 and 52 may be formed to simultaneously penetrate through the upper cover layer 12 among the protection layers C, a capacitance layer A, and a lower cover layer 13 among the protection layers C. When the vias 51 and 52 are formed at once to penetrate through the body as described above, the upper cover layer 12 may be squeezed-out toward the capacitance layer A due to high pressure as in vias 51a and 52a of the upper cover layer 12. The upper cover layer 12 squeezed-out as described above may deform dielectric layers 11 in the vicinity of upper portions of vias 51b and 52b of the capacitance layer A, thereby significantly increasing a possibility that a short-circuit will occur between the internal electrodes 21 and 22.

Particularly, due to deformation occurring in a case of forming the vias 51 and 52 at once to penetrate through the body, there is a need to sufficiently increase a distance between the via 51 connected to a first external electrode 91 and the via 52 connected to a second external electrode 92. As the distance between the vias 51 and 52 is increased, an area of a loop formed by the internal electrodes 21 and 22 and the vias 51 and 52 may be increased, and thus, ESL may be increased.

However, in the multilayer ceramic capacitor 100 according to the exemplary embodiment in the present disclosure, since a diameter of the alpha vias 131 and 132 is greater than a diameter of the beta vias 141 and 142, a short-circuit occurring between the first and second internal electrodes 121 and 122 may be prevented by allowing the protection layer C not to compress the capacitance layer A while the beta vias 141 and 142 directly contacting the internal electrodes 121 and 122 are formed, and an area of a loop formed by the first and second internal electrodes 121 and 122 and the first and second connection electrodes 151 and 152 may be decreased by enabling a decrease in an interval between the first and second connection electrodes 151 and 152, such that ESL of the multilayer ceramic capacitor 100 may be decreased.

The following Table 1 illustrates results obtained by measuring whether or not a short-circuit occurs depending on a ratio of the diameter of the alpha vias 131 and 132 to the diameter of the beta vias 141 and 142.

TABLE 1

| Sample | Ratio (%) of Diameter of Alpha Via to Diameter of Beta via | Does Short-circuit Occur? |
|---|---|---|
| 1 | 100 | ⊚ |
| 2 | 110 | ○ |
| 3 | 112 | ○ |
| 4 | 114 | ○ |
| 5 | 116 | ○ |
| 6 | 118 | ○ |
| 7 | 120 | X |
| 8 | 122 | X |
| 9 | 124 | X |
| 10 | 126 | X |

As a result of testing whether or not the short-circuit occurs on 100 chips per sample, a case in which a short-circuit occurrence rate was 1% or more was indicated by ⊚, a case in which the short-circuit occurrence rate was less than 1% was indicated by ○, and a case in which the short-circuit occurrence rate was 0 was indicated by x in Table 1.

Referring to Table 1, it may be confirmed that when the ratio of the diameter of the alpha vias 131 and 132 to the diameter of the beta vias 141 and 142 is 120% or more, a short-circuit problem due to formation of the via does not occur in the multilayer ceramic capacitor 100.

However, when the ratio of the diameter of the alpha vias 131 and 132 to the diameter of the beta vias 141 and 142 is excessively increased, a distance between a plurality of beta vias 141 and 142 may be increased, such that ESL of the multilayer ceramic capacitor may be increased.

The following Table 2 illustrates results obtained by measuring ESL and whether or not the short-circuit occurs depending on the distance between the alpha vias 131 and 132 corresponding to an interval between the first and second alpha connection electrodes 151a and 152a in the multilayer ceramic capacitors 100 in which the ratio of the diameter of the alpha vias 131 and 132 to the diameter of the beta vias 141 and 142 is 120% or more.

TABLE 2

| Sample | Interval (μm) between First and Second Alpha Connection Electrodes | Does Short-circuit Occur? | ESL (pH) |
|---|---|---|---|
| 1 | 100 | ⊚ | 50.5 |
| 2 | 150 | ○ | 55.1 |
| 3 | 200 | ○ | 90.1 |
| 4 | 250 | ○ | 100.2 |
| 5 | 300 | ○ | 111.0 |
| 6 | 350 | X | 115.5 |
| 7 | 400 | X | 122.1 |
| 8 | 450 | X | 125.8 |
| 9 | 500 | X | 135.2 |
| 10 | 550 | X | 146.5 |
| 11 | 600 | X | 150.1 |

As a result of testing whether or not the short-circuit occurs on 100 chips per each sample, a case in which a short-circuit occurrence rate is 1% or more is indicated by ⊚, a case in which the short-circuit occurrence rate is less than 1% is indicated by ○, and a case in which the short-circuit occurrence rate is 0 is indicated by x in Table 2. The interval between the first and second alpha connection electrodes 151a and 152a may mean a distance between a boundary of the first alpha connection electrode 151a and a boundary of the second alpha connection electrode 152a in a straight line connecting the centers of the first and second alpha connection electrodes 151a and 152a.

Referring to Table 2, it may be confirmed that when the interval between the first and second alpha connection electrodes 151a and 152a is within a range from 350 μm to 500 μm, the short-circuit does not occur and ESL is 140 pH or less.

That is, when the interval between the first and second alpha connection electrodes 151a and 152a is less than 350 μm, a short-circuit may occur between the first and second alpha connection electrodes 151a and 152a, and when the interval between the first and second alpha connection electrodes 151a and 152a is more than 500 μm, an area of a loop formed by the first and second alpha connection electrodes 151a and 152a together with the first and second internal electrodes 121 and 122 may be increased, and thus, ESL may be increased.

Therefore, when the interval between the first and second alpha connection electrodes 151a and 152a is within a range from 350 μm to 500 μm, the multilayer ceramic capacitor 100 according to the exemplary embodiment in the present disclosure may have ESL of 140 pH or less without occurrence of the short-circuit.

Figure 4:
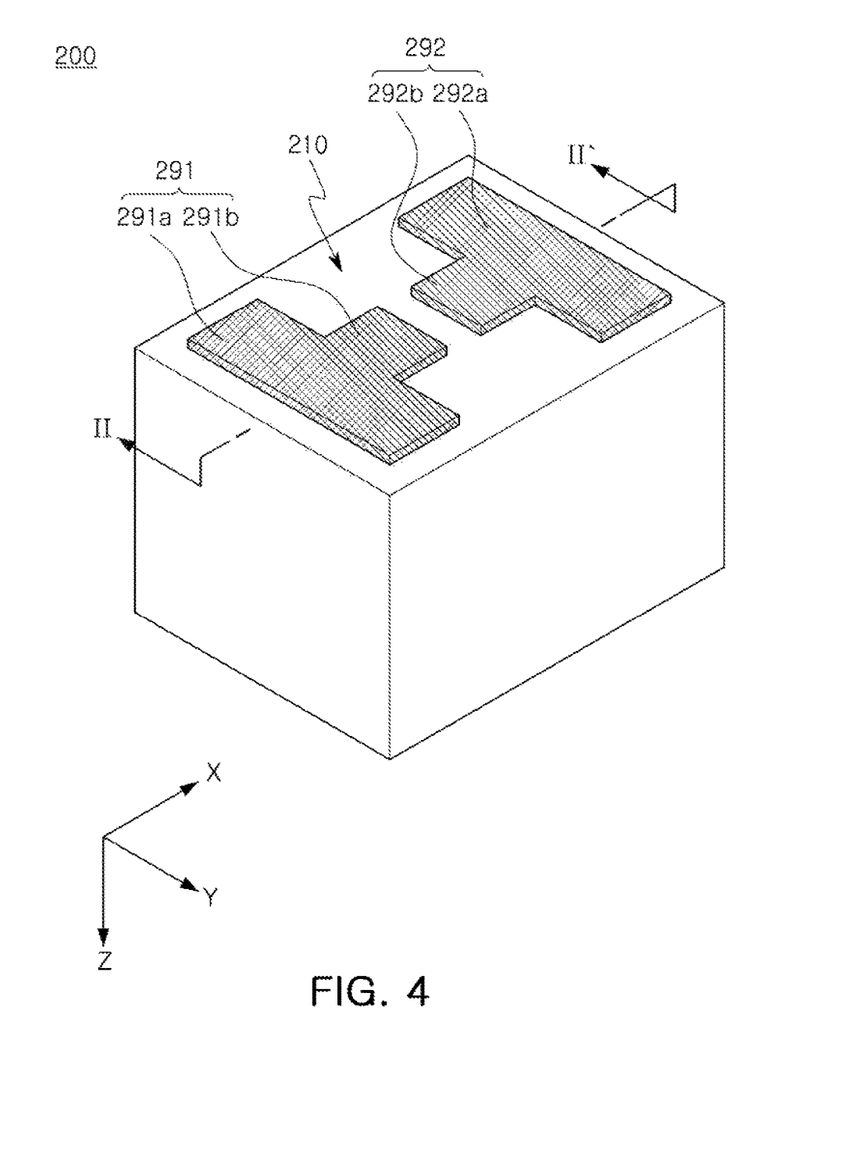
FIG. 4 is a schematic perspective view illustrating a multilayer ceramic capacitor according to another exemplary embodiment in the present disclosure.
Figure 5:
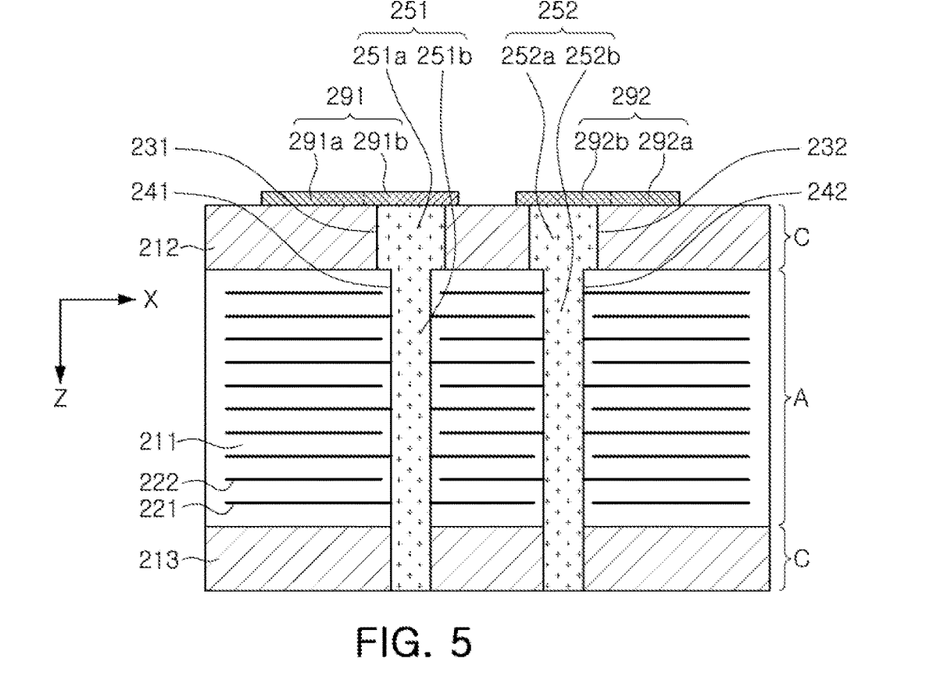
FIG. 5 is a schematic cross-sectional view taken along line II-II' of FIG. 4.

FIG. 4 is a schematic perspective view illustrating a multilayer ceramic capacitor according to another exemplary embodiment in the present disclosure, FIG. 5 is a schematic cross-sectional view taken along line II-II' of FIG. 4.

A multilayer ceramic capacitor 200 according to another exemplary embodiment in the present disclosure will be described with reference to FIGS. 4 and 5.

The multilayer ceramic capacitor 200 according to the exemplary embodiment in the present disclosure may include a body 210 and first and second external electrodes 291 and 292 disposed on an external surface of the body. The body 210 may include a capacitance layer A and a protection layer C.

The body 210 may be in a state in which a plurality of dielectric layers 211 are stacked, and be obtained by stacking a plurality of green sheets and sintering the stacked green sheets.

The body 210 may be formed by stacking four or more dielectric layers 211. For example, the body 110 may be formed by stacking 400 to 500 dielectric layers. Upper and lower cover layers 212 and 213 formed by stacking dielectric layers on which an internal electrode is not formed may be disposed in upper and lower portions of the body 210. The upper and lower cover layers 212 and 213 may correspond to the protection layer C. That is, the protection layer C may be disposed on and below the capacitance layer A.

First and second internal electrodes 221 and 222 disposed to face each other with respective dielectric layers 211 interposed therebetween may be included in an inner portion, that is, the capacitance layer A of the body 210. The internal electrodes 221 and 222 may be connected to the external electrodes 291 and 292 through connection electrodes 251 and 252, respectively.

Here, the connection electrodes 251 and 252 may include alpha connection electrodes 251a and 252a formed in the protection layer C and beta connection electrodes 251b and 252b formed in the capacitance layer A, respectively.

The beta connection electrodes 251b and 252b may include a first beta connection electrode 251b connected to the first internal electrode 221 and a second beta connection layer 252b connected to the second internal electrode 222. Further, the alpha connection electrodes 251a and 252a may include a first alpha connection electrode 251a connected to the first beta connection electrode 251b and a second alpha connection electrode 252a connected to the second beta connection electrode 252b. The first beta connection electrode 251b may be disposed to come into contact with the first internal electrode 221 and to be spaced apart from the second internal electrode 222, and the second beta connection electrode 252b may be disposed to come into contact with the second internal electrode 222 and to be spaced apart from the first internal electrode 221. The diameter of the alpha connection electrodes 251a and 252a may be substantially constant, and the diameter of the beta connection electrodes 251b and 252b may be substantially constant.

Alpha vias 231 and 232 penetrating through the protection layer C may be formed in the protection layer C. The alpha connection electrodes 251a and 252a may be formed by filling the alpha vias 231 and 232 with a conductive material. Further, beta vias 241 and 242 connected to the alpha vias 231 and 232 and penetrating through the capacitance layer A may also be formed in the capacitance layer A. The beta connection electrodes 251b and 252b may be formed by filling the beta vias 241 and 242 with a conductive material.

In the multilayer ceramic capacitor 200 according to another exemplary embodiment in the present disclosure, the first and second alpha connection electrodes 251a and 252a may be disposed in a central portion of the protection layer C. That is, in the multilayer ceramic capacitor 200 according to another exemplary embodiment in the present disclosure, the first and second alpha connection electrodes 251a and 252a may be disposed to have a shortest distance therebetween.

The first and second alpha connection electrodes 251a and 252a need to be connected to the first and second external electrodes, respectively, and when the first and second alpha connection electrodes 251a and 252a are disposed in the central portion of the protection layer C, the first and second external electrodes cannot but be disposed on the central portion. When the first and second external electrodes are disposed on the central portion of the protection layer C as described above, there is a limitation in decreasing an interval between the first and second alpha connection electrodes 251a and 252a due to sizes of the first and second external electrodes, and a separate design may be required at the time of mounting the multilayer ceramic capacitor on a board.

Therefore, in the multilayer ceramic capacitor 200 according to another exemplary embodiment in the present disclosure, a first pad 291a of the first external electrode 291 and a second pad 292a of the second external electrode 292 may be disposed on both sides in the first (X) or second (Y) direction based on the first and second alpha connection electrodes 251a and 252a, and a first connection pattern 291b extended from the first alpha connection electrode 251a to the first pad 291a of the first external electrode 291 and a second connection pattern 292b extended from the second alpha connection electrode 252a to the second pad 292a of the second external electrode 292 may be further included.

That is, ESL of the multilayer ceramic capacitor 200 may be significantly decreased by significantly decreasing the first and second alpha connection electrodes 251a and 252a while freely changing positions of the first and second external electrodes 291 and 292 due to the first and second connection patterns 291b and 292b.

Method for Manufacturing Multilayer Ceramic Capacitor

FIGS. 6 through 10 are schematic cross-sectional views illustrating each process in a method for manufacturing a multilayer ceramic capacitor according to another exemplary embodiment in the present disclosure.

Hereinafter, the method for manufacturing a multilayer ceramic capacitor according to another exemplary embodiment in the present disclosure will be described with reference to FIGS. 6 through 10.

Figure 6:
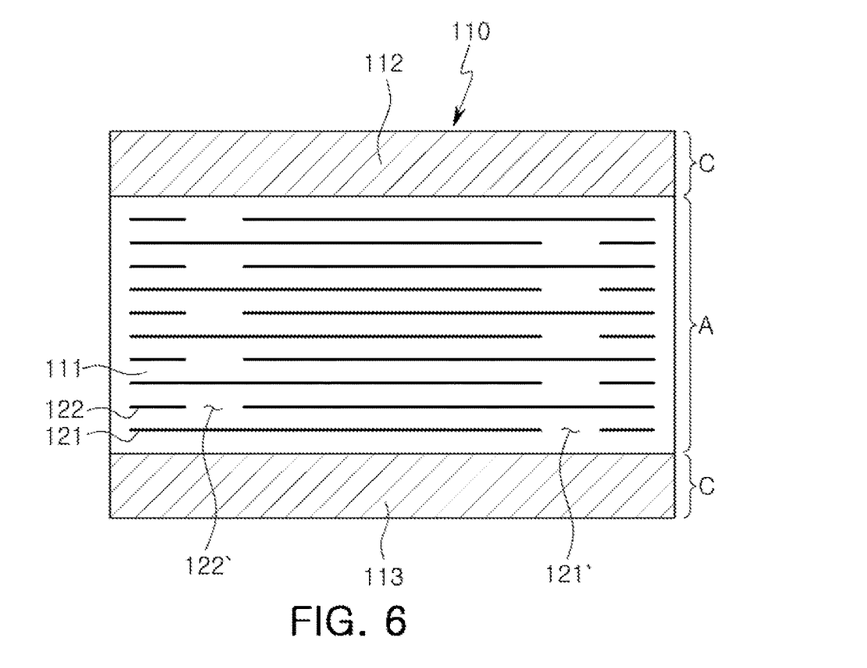
FIGS. 6 through 10 are schematic cross-sectional views illustrating each process in a method for manufacturing a multilayer ceramic capacitor according to another exemplary embodiment in the present disclosure.

First, referring to FIG. 6, a body 110 including a capacitance layer A including dielectric layers 111 and first and second internal electrodes 121 and 122 disposed with respective dielectric layers interposed therebetween; and a protection layer C disposed on one surface of the capacitance layer A may be prepared.

The body 110 may be in a state in which a plurality of dielectric layers 111 are stacked, and may be obtained by stacking a plurality of green sheets and sintering the stacked green sheets. The plurality of dielectric layers 111 may be integrated with each other by the sintering as described above. A shape and dimensions of the body 110 and the number of stacked dielectric layers 111 are not limited to those of the exemplary embodiment illustrated in the accompanying drawings. For example, the body 110 may have a rectangular parallelepiped shape as illustrated in FIG. 6.

The dielectric layer 111 included in the body 110 may contain a ceramic material having high permittivity. For example, the dielectric layer 111 may contain a barium titanate ($BaTiO_3$) based material or a strontium titanate ($SrTiO_3$) based material, but another material known in the art may also be used as long as sufficient capacitance may be obtained from the use thereof. If necessary, an additive, an organic solvent, a plasticizer, a binder, a dispersant, and the like, in addition to the ceramic material as described above, may be further contained in the dielectric layer 111. Thereamong, the same material as a material contained in internal electrodes 121 and 122 may be contained as the additive, and a content of the additive as described above may be locally suitably adjusted so as to secure uniform sintering properties.

The body 110 may be formed by stacking four or more dielectric layers 111. For example, the body 110 may be formed by stacking 400 to 500 dielectric layers. Upper and lower cover layers 112 and 113 formed by stacking dielectric layers on which an internal electrode is not formed may be disposed in upper and lower portions of the body 110. The upper and lower cover layers 112 and 113 may correspond to the protection layer C. That is, the protection layer C may be disposed on and below the capacitance layer A.

First and second internal electrodes 121 and 122 disposed to face each other with respective dielectric layers 111 interposed therebetween may be included in an inner portion, that is, the capacitance layer A of the body 110. The first and second internal electrodes 121 and 122 may be connected to different external electrodes 191 and 192 to be described below, thereby having different polarities from each other at the time of driving. The first and second internal electrodes 121 and 122 may be obtained by printing a paste containing a conductive metal on one surface of a ceramic green sheet to a predetermined thickness and then sintering the printed ceramic green sheet. Here, the first and second internal electrodes 121 and 122 may include first and second insulating portions 121' and 122', respectively. The first and second insulating portions 121' and 122' may mean regions in which the internal electrodes are not formed, and serve to allow the first and second internal electrodes 121 and 122 to be connected to external electrodes having different polarities, respectively. An example of a main material configuring the first and second internal electrodes 121 and 122 may include nickel (Ni), copper (Cu), palladium (Pd), silver (Ag), or the like, and an alloy thereof may also be used.

Figure 7:
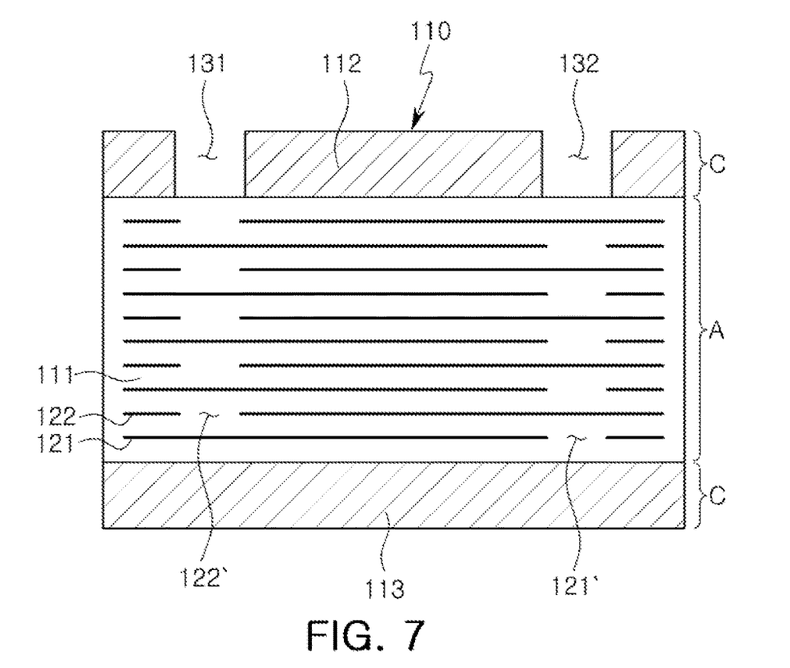

Next, alpha vias 131 and 132 penetrating through the protection layer C may be formed in the protection layer C as illustrated in FIG. 7. The alpha vias 131 and 132 may include a first alpha via 131 formed in a position corresponding to the second insulating portion 122' and a second alpha via 132 formed in a position corresponding to the first insulating portion 121' in the stacking direction.

The alpha vias 131 and 132 may be formed using a pin, a drill, or a laser.

The alpha vias 131 and 132 may be formed to have an interval therebetween in a range of 350 μm to 500 μm so that an interval between first A and B connection electrodes 151a and 152a to be described below is 350 μm to 500 μm.

Figure 8:
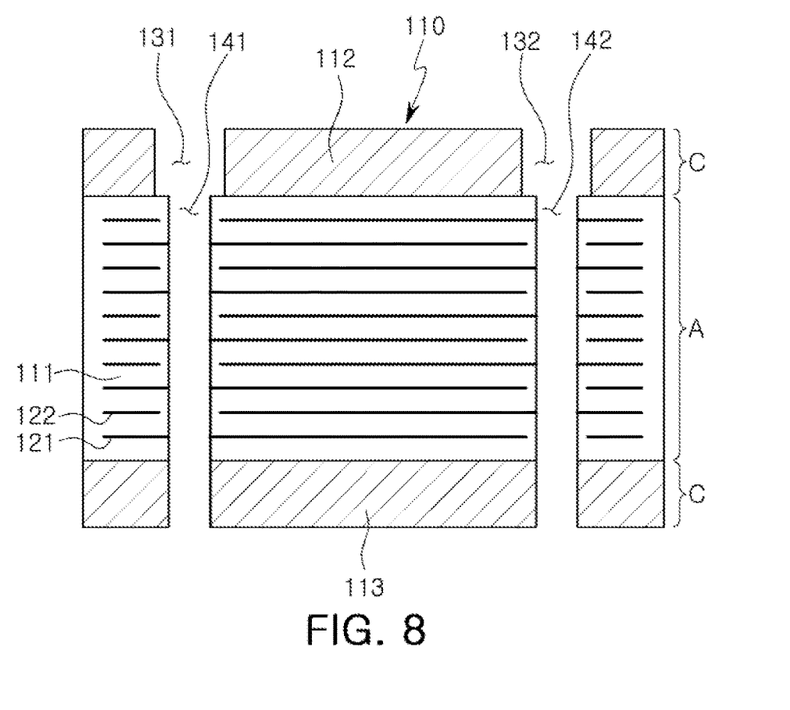

After the alpha vias 131 and 132 are formed, as illustrated in FIG. 8, beta vias 141 and 142 penetrating through the capacitance layer A and having a diameter smaller than that of the alpha vias 131 and 132 may be formed in the alpha vias 131 and 132. The diameter of the alpha vias 131 and 132 may be substantially constant, and the diameter of the beta vias 141 and 142 may be substantially constant.

In a case in which the beta vias 141 and 142 are formed using the laser at the time of forming the beta vias 141 and 142, the internal electrodes 121 and 122 may be deformed by heat, such that a short circuit defect occurring between the internal electrodes 121 and 122 may be significantly increased.

Therefore, the beta vias 141 and 142 may be formed using a physical penetration tool such as a pin or a drill instead of the laser.

In a case of forming first and second vias at once to penetrate through a body, there is a problem in that an upper cover layer may be squeezed-out toward a capacitance layer due to a high pressure.

However, in the multilayer ceramic capacitor 100 according to the exemplary embodiment in the present disclosure, since a diameter of the alpha vias 131 and 132 is greater than a diameter of the beta vias 141 and 142, a short-circuit occurring between the first and second internal electrodes 121 and 122 may be prevented by allowing the protection layer C not to compress the capacitance layer A while the beta vias 141 and 142, directly contacting the internal electrodes 121 and 122, are formed, and an area of a loop formed by the first and second internal electrodes 121 and 122 and the first and second connection electrodes 151 and 152 may be decreased by enabling a decrease in an interval between the first and second connection electrodes 151 and 152, such that ESL of the multilayer ceramic capacitor 100 may be decreased.

Here, the alpha vias 131 and 132 may be formed so that the diameter thereof is at least 20% larger than that of the beta vias 141 and 142.

The beta vias 141 and 142 may include a first beta via 141 penetrating through the second insulating portion 122' and a second beta via 142 penetrating through the first insulating portion 121'.

Figure 9:
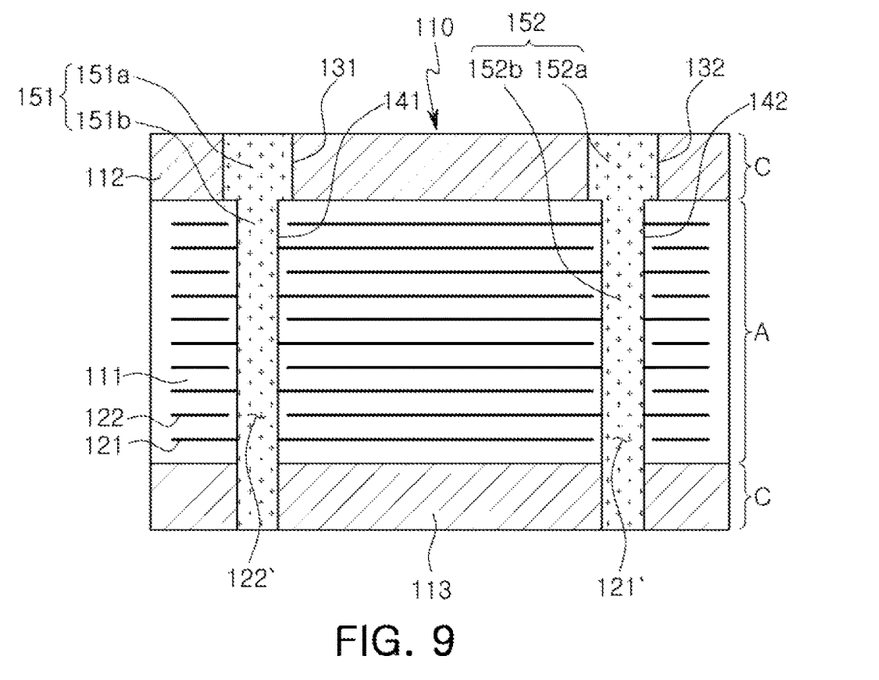

Next, as illustrated in FIG. 9, first and second connection electrodes 151 and 152 may be formed by filling the alpha vias 131 and 132 and the beta vias 141 and 142 with a conductive material.

Here, the connection electrodes 151 and 152 may include alpha connection electrodes 151a and 152a formed in the protection layer C and beta connection electrodes 151b and 152b formed in the capacitance layer A, respectively.

The beta connection electrodes 151b and 152b may include a first beta connection electrode 151b connected to the first internal electrode 121 and a second beta connection electrode 152b connected to the second internal electrode 122. Further, the alpha connection electrodes 151a and 152a may include a first alpha connection electrode 151a formed in a position corresponding to the first beta connection electrode 151b and a second alpha connection electrode 152a formed in a position corresponding to the second beta connection electrode 152b.

Since the first beta via 141 penetrates through the second insulating portion 122', the first beta connection electrode 151b may come into contact with the first internal electrode 121 and be spaced apart from the second internal electrode 122. Further, since the second beta via 142 penetrates through the first insulating portion 121', the second beta connection electrode 152b may come into contact with the second internal electrode 122 and be spaced apart from the first internal electrode 121.

Figure 10:
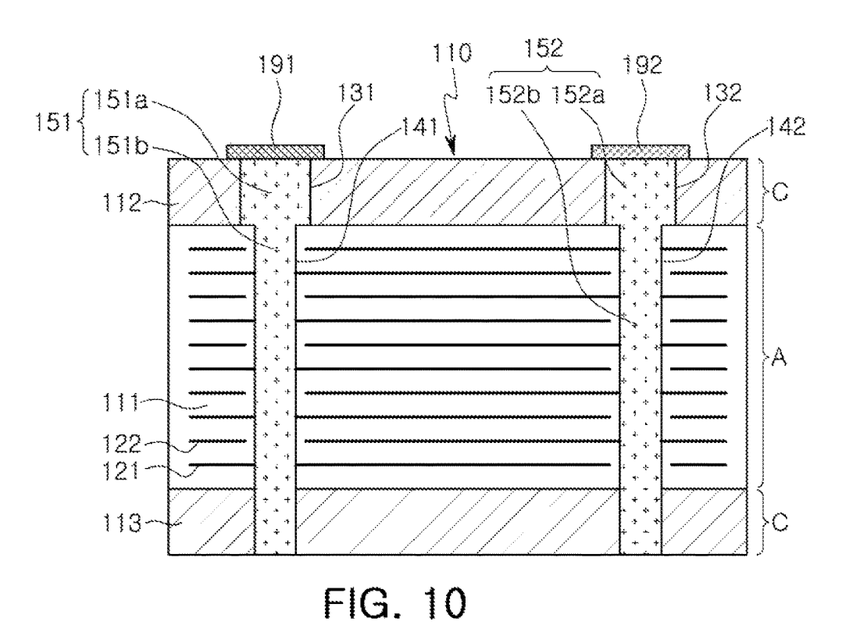

Finally, referring to FIG. 10, a first external electrode 191 connected to the first alpha connection electrode 151a may be formed on one surface of the protection layer C, and a second external electrode 192 spaced apart from the first external electrode 191 and connected to the second alpha connection electrode 152a may be formed on one surface of the protection layer C.

However, as in the multilayer ceramic capacitor according to another exemplary embodiment in the present disclosure illustrated in FIGS. 5 and 6, the first and second alpha connection electrodes may be formed in a central portion of the protection layer, and the first and second external electrodes may be formed on both sides based on the first and second alpha connection electrodes. Here, the forming of the first and second external electrodes 291 and 292 may include forming the first and second pad on both sides based on the first and second connection electrodes, and forming a first connection pattern 291b extended from the first alpha connection electrode 251a to the first pad 291a and a second connection pattern 292b extended from the second alpha connection electrode 252a to the second pad 292a.

As set forth above, according to exemplary embodiments in the present disclosure, since in the multilayer ceramic capacitor, the first via has a diameter greater than that of the second via, at the time of forming the second via, deformation of the internal electrodes may be prevented or significantly decreased.

While exemplary embodiments have been shown and described above, it will be apparent to those skilled in the art that modifications and variations could be made without departing from the scope of the present invention as defined by the appended claims.

What is claimed is:
1. A multilayer ceramic capacitor comprising:
 a capacitance layer including dielectric layers and first and second internal electrodes disposed with respective dielectric layers interposed therebetween;
 a protection layer disposed on one surface of the capacitance layer;

an alpha connection electrode provided in an alpha via penetrating through the protection layer; and
a beta connection electrode provided in a beta via penetrating through the capacitance layer and connected to the alpha via,
wherein the alpha via has a diameter greater than that of the beta via,
wherein a ratio of the diameter of the alpha via to the diameter of the beta via is 110% or more.

2. The multilayer ceramic capacitor of claim 1, wherein the ratio of the diameter of the alpha via to the diameter of the beta via is 120% or more.

3. The multilayer ceramic capacitor of claim 1, wherein the beta connection electrode includes:
a first beta connection electrode in contact with the first internal electrode and spaced apart from the second internal electrode; and
a second beta connection electrode in contact with the second internal electrode and spaced apart from the first internal electrode.

4. The multilayer ceramic capacitor of claim 3, wherein the alpha connection electrode includes:
a first alpha connection electrode disposed in a position of the protection layer corresponding to the first beta connection electrode; and
a second alpha connection electrode disposed in a position of the protection layer corresponding to the second beta connection electrode.

5. The multilayer ceramic capacitor of claim 4, wherein an interval between the first and second alpha connection electrodes is within a range from 350 μm to 500 μm.

6. The multilayer ceramic capacitor of claim 4, further comprising:
a first external electrode disposed on one surface of the protection layer and connected to the first alpha connection electrode; and
a second external electrode disposed on one surface of the protection layer, spaced apart from the first external electrode, and connected to the second alpha connection electrode.

7. The multilayer ceramic capacitor of claim 6, wherein the first and second alpha connection electrodes are disposed in a central portion of the protection layer, and
the first and second external electrodes are disposed on both sides based on the first and second alpha connection electrodes, and further include a first connection pattern extended from the first alpha connection electrode to the first external electrode and a second connection pattern extended from the second alpha connection electrode to the second external electrode, respectively.

8. The multilayer ceramic capacitor of claim 1, wherein the diameter of the alpha via is substantially constant, and the diameter of the beta via is substantially constant.

9. A method for manufacturing a multilayer ceramic capacitor, the method comprising:
preparing a body including a capacitance layer including dielectric layers and first and second internal electrodes disposed with respective dielectric layers interposed therebetween, and a protection layer disposed on one surface of the capacitance layer;
forming an alpha via penetrating through the protection layer in the protection layer;
forming a beta via penetrating through the capacitance layer exposed in the alpha via and having a diameter smaller than that of the alpha via; and
forming alpha and beta connection electrodes by filling the alpha and beta vias with a conductive material,
wherein a ratio of the diameter of the alpha via to the diameter of the beta via is 110% or more.

10. The method of claim 9, wherein the ratio of the diameter of the alpha via to the diameter of the beta via is 120% or more.

11. The method of claim 9, wherein the beta via is formed by a physical penetration method.

12. The method of claim 9, wherein the beta connection electrode includes:
a first beta connection electrode in contact with the first internal electrode and spaced apart from the second internal electrode; and
a second beta connection electrode in contact with the second internal electrode and spaced apart from the first internal electrode.

13. The method of claim 12, wherein the alpha connection electrode includes:
a first alpha connection electrode disposed in a position of the protection layer corresponding to the first beta connection electrode; and
a second alpha connection electrode disposed in a position of the protection layer corresponding to the second betaq connection electrode.

14. The method of claim 13, wherein an interval between the first and second alpha connection electrodes is within a range from 350 μm to 500 μm.

15. The method of claim 13, further comprising:
forming a first external electrode connected to the first alpha connection electrode on one surface of the protection layer; and
forming a second external electrode spaced apart from the first external electrode and connected to the second alpha connection electrode on one surface of the protection layer.

16. The method of claim 15, wherein the first and second alpha connection electrodes are formed in a central portion of the protection layer,
the first and second external electrodes are formed on both sides based on the first and second alpha connection electrodes, and
the forming of the first and second external electrodes includes:
forming first and second pads on both sides based on the first and second alpha connection electrodes, and
forming a first connection pattern extending from the first alpha connection electrode to the first pad and a second connection pattern extending from the second alpha connection electrode to the second pad.

17. The method of claim 9, wherein the diameter of the alpha via is substantially constant, and the diameter of the beta via is substantially constant.

* * * * *